W. SHAND.
NUT BURRING AND FACING MACHINE.
APPLICATION FILED APR. 12, 1909.

959,624.

Patented May 31, 1910.
2 SHEETS—SHEET 1.

Witnesses.
Harry Davis
G. H. Tresidder

Inventor.
W. Shand.
by
Fetherstonhaugh
Atty

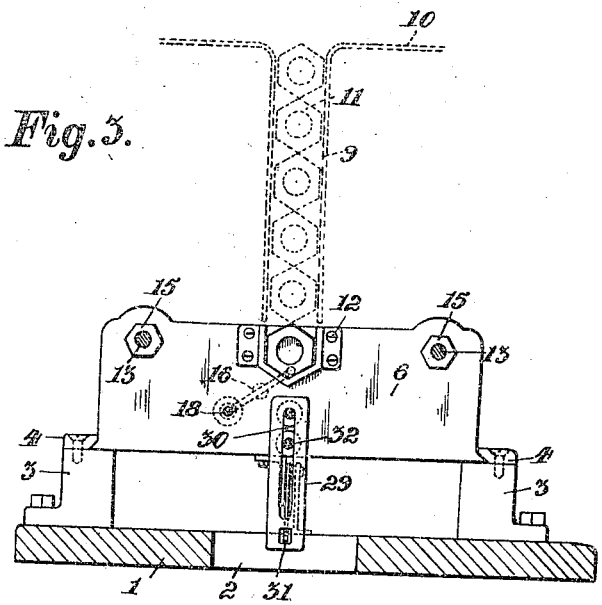

UNITED STATES PATENT OFFICE.

WILLIAM SHAND, OF MONTREAL, QUEBEC, CANADA, ASSIGNOR OF ONE-HALF TO JOSEPH PRESNER, OF MONTREAL, CANADA.

NUT BURRING AND FACING MACHINE.

959,624.   Specification of Letters Patent.   Patented May 31, 1910.

Application filed April 12, 1909.  Serial No. 489,429.

*To all whom it may concern:*

Be it known that I, WILLIAM SHAND, a subject of the King of Great Britain, and resident of 1405 Wellington street, in the city and district of Montreal, in the Province of Quebec, in the Dominion of Canada, have invented certain new and useful Improvements in Nut Burring and Facing Machines; and I do hereby declare that the following is a full, clear, and exact description of the same.

The invention relates to improvements in nut burring and facing machines as described in the present specification and illustrated in the accompanying drawings that form part of the same.

The invention consists essentially in the novel arrangement and construction of parts whereby means are employed to bring the nut up to the cutting tool and face it and to feed the nut at the other end of the said movement without interrupting the continuous operation of the machine.

The objects of the invention are to devise a machine for the particular purpose of facing off nuts and thus save expense in the manufacture thereof, to provide a simple, cheap and efficient machine, and generally to furnish a light serviceable and quick acting machine.

Figure 1:
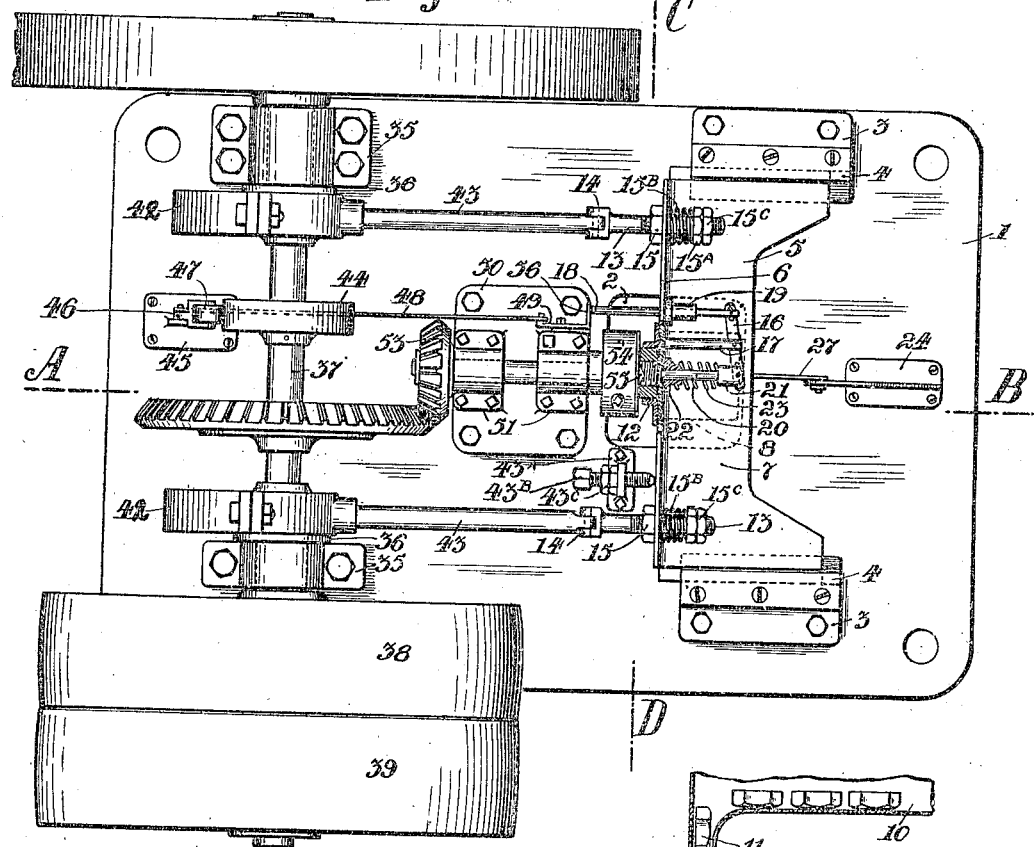
Figure 2:
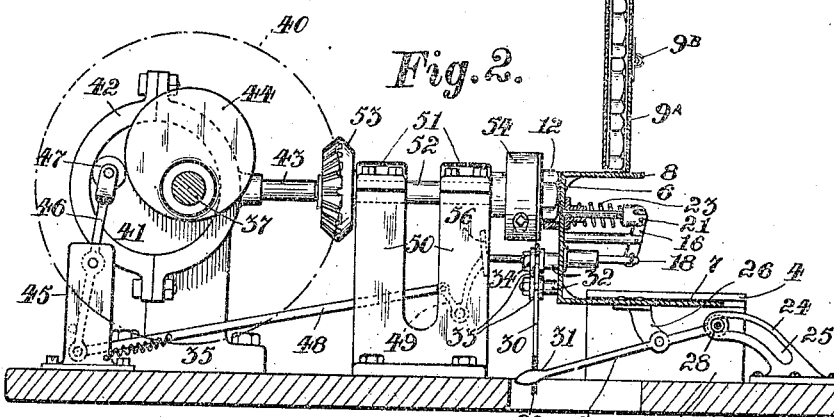

In the drawings, Figure 1 is a plan view of the machine. Fig. 2 is a longitudinal section on the line A—B in Fig. 1. Fig. 3 is a cross sectional view on the line C—D in Fig. 1. Fig. 4 is a detail of a modified form of nut holder.

Like numerals of reference indicate corresponding parts in each figure.

Referring to the drawings, 1 is the base having the opening 2 therethrough. 3 are brackets rigidly secured to said frame and supporting the guides 4.

5 is the carriage formed of an angle plate having vertical section 6 and horizontal section 7, the latter extending into the guides 4 and supported thereby.

8 is a shelf centrally arranged and extending rearwardly from the top of the vertical section 6.

9 is a chute leading from the hopper 10 and forming the passage for the nuts 11 to the nut holder 12, the latter being secured to the front of the vertical section 6, the said shelf forming a stop at the bottom of the chute 9 to prevent the discharge of the nuts therefrom except at the regulated times when one nut slips into the holder 12.

$9^a$ is a hinged flap at the lower end of the chute 9, said flap being spring-held by the coil spring $9^b$ to its closed position, thus the said flap may be lifted in order to clear the nut if there is any stoppage in the feed.

13 are threaded rods inserted in corresponding holes in the vertical section 6, having the forked ends 14 and held in the desired position in the said vertical section 6 by the nuts 15 and $15^a$.

$15^b$ are spiral springs encircling the rods 13 between the nuts $15^a$ and the vertical section 6.

$15^c$ are lock nuts securing the nuts $15^a$ in place.

16 is a rocker arm pivotally secured on the bracket 17, the latter extending rearwardly from the vertical section 6 and rigidly secured thereto.

18 is a rod pivotally secured to one end of the rocker arm 16 and extending through a suitable bearing 19 and corresponding hole in the vertical section 6, and slidably arranged therein. 20 is a kicker pin having the head 21 and pivotally secured to the other end of the said rocker arm 16, said pin extending through the bearing 22 and a corresponding hole in the vertical section, being slidably arranged in said bearing and hole.

23 is a spiral spring encircling the pin 20 and abutting the head at one end and the flange of the bearing 22 at the other, thus retaining said pin normally away from said plate section 6.

24 is a bracket rigidly secured to the base 1 and having a longitudinal angle slot 25, said angle slot being formed in a short horizontal portion and an incline portion from said horizontal portion.

26 is a bracket rigidly secured to the underside of the horizontal plate section 7.

27 is a rod pivotally secured intermediate of its length in the bracket 26 and having journaled at one end thereof, the roller 28, said roller extending into the angle slot 25 and traveling therein with the movement of the carriage 5.

29 is a plate having the vertical slot 30 for the greater part of its length and the small slot 31 immediately beneath said slot 30.

32 are pins projecting outwardly from the vertical plate section 6 in the center thereof and arranged in vertical alinement, said pins having the shoulders 33. The pins 31 are threaded at their outer ends and extend through the longitudinal slot 30, so that the plate rests against the shoulders 33, being held in position by the nuts 34 on said pins. The rod 27 extends into the small slot 30, so that as the carriage travels backward and forward, the said plate is lifted and lowered over and away from the nut holder 12, thus when the carriage moves rearwardly to receive the nut, the plate is lifted upwardly forming a pocket into which the nut drops from the chute 9 and as the carriage travels forwardly for the purpose of having the nut faced, the plate 29 is lowered.

35 are standards supporting the bearings 36.

37 is a shaft journaled in the bearings 36.

38 and 39 are fast and loose pulleys mounted on said shaft to the outside of the bearings 36.

40 is a beveled gear wheel mounted on the shaft 37.

41 are eccentrics mounted on the shaft 37 and encircled by the straps 42.

43 are rods connecting the straps 42 to the forked ends 14 of the rods 13, being pivotally secured in said forked ends, consequently on the rotation of the shaft, a forward and backward movement is imparted to the carriage 5, said carriage traveling in the guides 4.

43$^a$ is a bracket secured to the base 1 in front of the vertical section 6 of the carriage, said bracket having a threaded hole through the vertical portion thereof. 43$^b$ is a threaded pin inserted in the correspondingly threaded hole in said bracket 43$^a$. 43$^c$ are lock nuts for securing said pin in the desired position in said threaded hole in the bracket. The pin 43$^b$ serves as a stop to the further travel of the carriage in the direction of the shaft 37 and is adjustable.

44 is a cam or disk eccentrically mounted on the shaft 37.

45 is a bracket rigidly secured to the base 1.

46 is an arm pivotally secured in the bracket 45 and having the roller 47 journaled at the upper end thereof.

48 is a rod pivotally secured at one end to the lower end of the arm 46 and at the other end to one section of the crank lever 49.

50 are standards supporting the bearings 51, said bearings 51 being at right angles to the shaft 37 and said standards being rigidly secured to the base 1 between the bearings 36 and the carriage 5.

52 is a shaft journaled in the bearings 51.

53 is a bevel pinion coacting with the bevel gear wheel 40 and mounted on the shaft 52.

54 is a tool holder having suitable cutters therein arranged and mounted at the other end of the shaft 52, said tool holder having a tapering centering pin 55 in the middle thereof, said pin being adapted to enter the bore of the nut as the carriage moves up to said cutter. The crank lever 49 is pivotally secured to the side of one of the standards 50 and has a laterally projecting arm 56 engaging the rod 18, the cam 44 being so mounted on the shaft 37 as to time the operation of said crank lever for the purpose of sliding the rod 18 and operating the kicker pin 20 to discharge the nut after facing from the nut holder 12.

In the operation of this machine, the shaft 37 is set in motion in the usual manner and through the revolution of the shaft the travel of the carriage is started and continuously carried on while the said shaft is rotated. In the extreme rear position of the carriage, a nut drops from the chute into the nut holder 12, the plate 29 being in its uppermost position at the time the nut drops, forming, as hereinbefore explained, a pocket. There is a momentary pause at the end of the stroke of the rods 43 as customary in reciprocating machines. This gives the nut a chance to drop into the pocket arranged and the forward stroke commences and at the completion of the forward stroke, a similar momentary pause occurs which gives the necessary opportunity for the cutter to face the nut in the holder. This pause is lengthened by the cushioning of the rods 13, the stop 43$^b$ holding the carriage while the eccentric finishes the revolution against the pressure of the spiral springs 15$^b$, consequently plenty of time is allowed for the proper facing of the nut. The plate 29 drops during said forward stroke through the drawing of the roller 28 up into the horizontal portion of the angle slot 25. The nut being faced off, the carriage begins its backward movement and as said movement continues, the lever arrangement through to the rod 18 operates by means of the cam 44, the rod 18 being slid in its bearings operates the kicker pin, which engages the nut and discharges it from the holder immediately following the drawing away of the cutter. In the meantime, the plate 29 is beginning to lift and as the roller 28 continues down the incline of the angle slot 25, the said plate lifts into position ready for the nut to drop into the pocket, thus formed, immediately the shelf 8 has cleared the opening to the chute. This operation is repeated continuously so that the machine is in constant motion, the advantage being that the reciprocating movement obtained through the eccentric and rod connection to the carriage gives the two necessary pauses, though momentary, for feeding and facing and insures the successful operation of the machine.

In Fig. 4, a modified form of nut holder is shown, particularly arranged for large hexagon-shaped nuts, though it may be used for any shape, and in this the holder to receive the said nut, in place of being rigidly attached to the vertical section 6 is formed with the stem 57 at its lower end, said stem extending into the socket 58, the latter being rigidly secured to the said vertical section, a small spring 59 encircles the stem 57 between the body of the said nut holder and the socket 58 in order to provide resiliency to the lower part of said holder.

This nut facing machine is particularly useful in large factories where two or more machines can be grouped, one hopper being sufficient for two machines, having the chutes running down one from each side of the hopper, thereby saving labor in the feeding of the machines for one boy can readily take charge of two machines.

What I claim as my invention is:

1. In a nut facing machine, the combination with the frame of the machine, of a carriage supporting a suitable nut holder and slidably arranged, a main shaft suitably driven, eccentrics mounted on said main shaft, rods connecting said eccentrics to said carriage, yielding means in the connections of said rods to the said carriage, a cutter, and means for driving said cutter.

2. In a device of the class described, in combination, a base, a pair of guides supported on said base, an angle plate sliding in said guides and forming a carriage and having a nut holder thereon arranged, standards rigidly secured and projecting upwardly from said base, bearings supported thereby, a main shaft journaled in said bearings, a pair of eccentrics mounted on said main shaft, and straps encircling said eccentrics, rods adjustably secured in the vertical section of said carriage having forked ends, connecting rods joining said straps to said forked ends, a cutter shaft, bearings supported from said base for said cutter shaft, a tool holder mounted on said cutter shaft and cutters therein arranged, a pinion mounted at the other end of said cutter shaft, a gear wheel mounted on said main shaft and coacting with said pinion, and means for operating said main shaft.

3. In a device of the class described, in combination, a base, guides supported on said base, an angle plate forming a carriage and having a suitable nut holder and sliding in said guides, standards projecting from said base and rigidly secured thereto, bearings supported by said standards, a main shaft journaled in said bearings, a cutter shaft, bearings therefor supported from said base, means for operating said cutter shaft from said main shaft, an eccentric and rod mechanism connecting said carriage and main shaft, a cam mounted on said main shaft, a kicker pin pivotally supported to the rear of said nut holder and extending thereinto, and a chain of levers operatively connecting said cam and said kicker pin.

4. In a device of the class described, in combination, a base, guides supported on said base, an angle plate forming a carriage and having a suitable nut holder and sliding in said guides, standards projecting from said base and rigidly secured thereto, bearings supported by said standards, a main shaft journaled in said bearings, a cutter shaft, bearings therefor supported from said base, means for operating said cutter shaft from said main shaft, an eccentric and rod mechanism connecting said carriage and main shaft, a cam mounted on said main shaft, a kicker pin having a suitable head and extending into said nut holder from the rear of the vertical plate of said carriage, a rocker arm suitably supported and pivotally joined to said kicker pin, a spiral spring encircling said kicker pin between the head thereof and said plate, a rod pivotally joined to the other end of said rocker arm and extending through said vertical plate, a crank lever pivotally supported engaging the latter rod, a pivoted cam, and a rod connecting said pivoted lever and said crank lever.

5. In a device of the class described, in combination, a base, guides supported by said base, an angle plate forming a carriage and traveling in said guides and having a suitable nut holder, a nut hopper having a suitable chute therefrom, a shelf extending rearwardly from the vertical plate of said carriage under said chute, a slotted plate, pins extending from the vertical plate of said carriage having suitable shoulders and in vertical alinement and extending through the slot in said plate, nuts securing said plate on said pins, a bracket rigidly secured to the underside of the horizontal plate of said carriage, a rod pivotally secured in said bracket and connected with the lower end of said plate, a bracket rigidly secured to said base and having an angle slot therein arranged, a roller journaled on said pivoted rod extending into said slot, a main shaft, bearings for said main shaft supported from said base, a cutter shaft, bearings supported from said base therefor, a cutter, and means for moving said carriage to and from said cutter and insuring a slight pause for feeding purposes.

6. In a device of the class described, the combination with the base having a suitable discharge hole therethrough, bearings supported thereon and a main shaft turning in said bearings, of a carriage traveling in suitable guides, a nut holder supported centrally and to the front of said carriage, means for moving said carriage to and from said cutter and insuring a pause at the end of each stroke, means for facing said nut operated from said main shaft, a nut chute, a pocket registering in one position of the carriage with said chute and open on one side toward the cutting tool, a member temporarily closing said open side of the pocket during the forward movement of the carriage, and means for operating said member, adapted to withdraw the same and expose the nut just prior to the engagement of the cutting tool.

7. In a device of the class described, the combination with the base having a suitable discharge hole therethrough, bearings supported thereon and a main shaft turning in said bearings, of a carriage traveling in suitable guides, a nut holder supported centrally and to the front of said carriage, means for moving said carriage to and from said cutter and insuring a pause at the end of each stroke, means for facing said nut operated from said main shaft, a nut chute, a pocket registering in one position of the carriage with said chute and open on one side toward the cutting tool, a member temporarily closing said open side of the pocket during the forward movement of the carriage, and means for operating said member, adapted to withdraw the same and expose the nut just prior to the engagement of the cutting tool, and automatic means for ejecting said nut from said holder following the facing operation.

8. In a device of the class described, in combination with a base, a carriage arranged for reciprocal travel on said base, a driven shaft, a pair of eccentrics mounted on said shaft, and straps encircling said eccentrics and rods extending therefrom, a pair of threaded rods pivotally secured to the aforesaid rods adjustably secured in said carriage, cushion springs encircling said rods, secured in said carriage, a cutter journaled in stationary bearings, a nut holder secured in said carriage, and an adjustable stop secured to said base and engaging said carriage as it reaches said nut facing tool.

Signed at the city and district of Montreal, in the Province of Quebec, in the Dominion of Canada, this 10th day of April, 1909.

WILLIAM SHAND.

Witnesses:
G. H. TRESIDDER,
P. SHEE.